July 21, 1942.  W. J. MILLER  2,290,762
MACHINE FOR EDGE GLUING VENEER STRIPS
Filed Nov. 28, 1940  3 Sheets-Sheet 1

INVENTOR
William J. Miller
BY
Fred G. Matheny
ATTORNEY

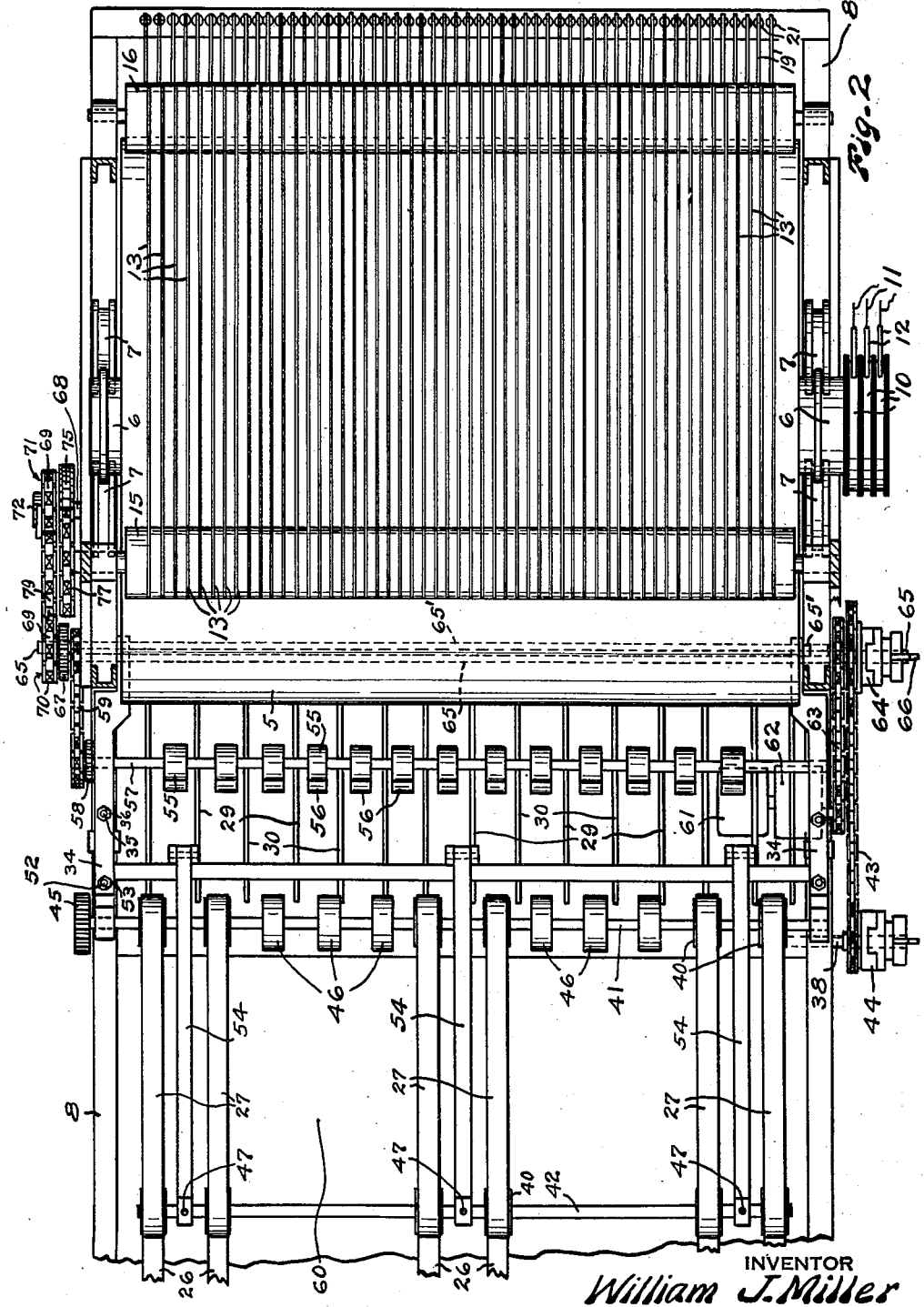

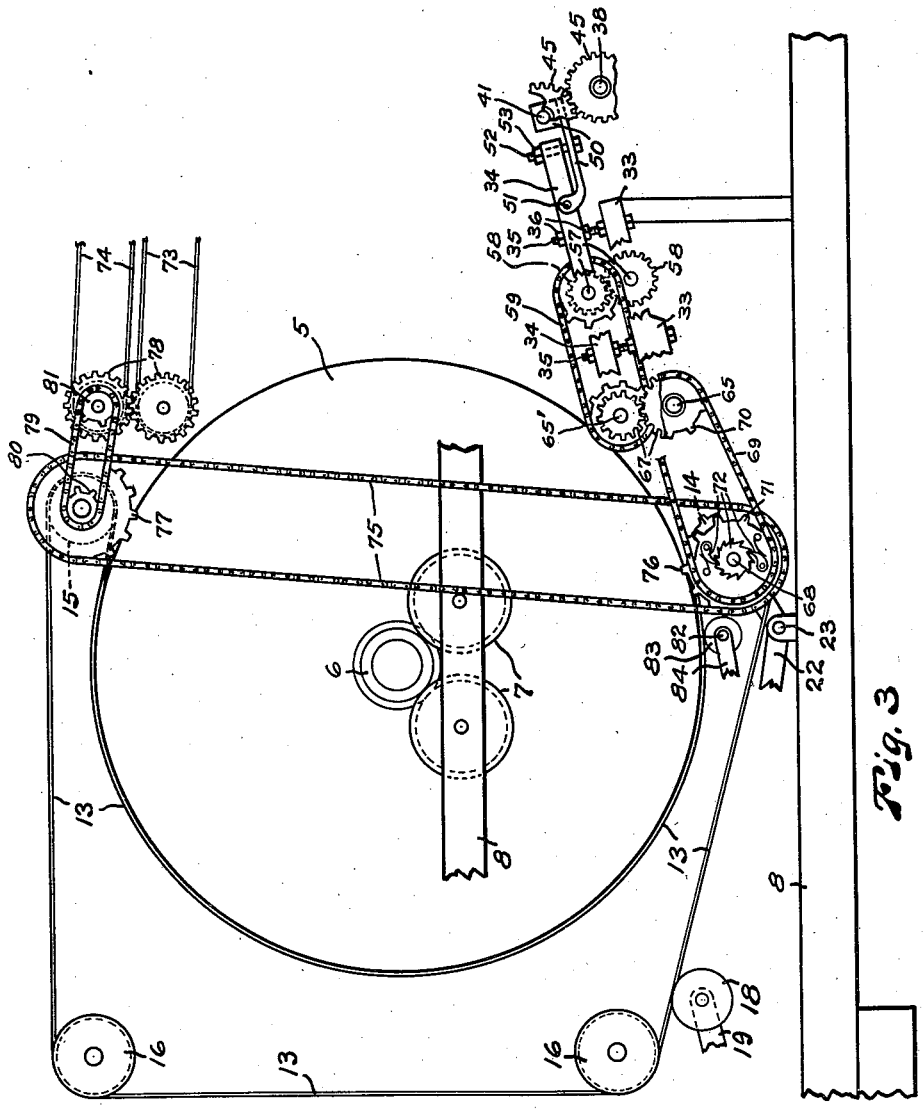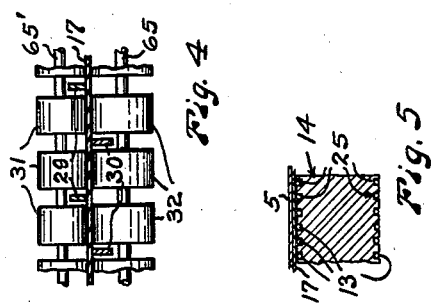

Patented July 21, 1942

2,290,762

UNITED STATES PATENT OFFICE 2,290,762

MACHINE FOR EDGE GLUING VENEER STRIPS

William J. Miller, Seattle, Wash., assignor to Elliott Bay Mill Co., Seattle, Wash., a corporation of Washington Application November 28, 1940, Serial No. 367,558

5 Claims. (Cl. 144—279)

This invention relates to a machine for joining veneer strips together in edge to edge relation, and the machine herein disclosed and claimed is adapted for carrying out the method of edge gluing veneer strips disclosed and claimed in my prior application Serial No. 268,035, filed Apr. 15, 1939.

The general objects of this invention are to provide a new and improved machine for edge joining strips of veneer whereby an increase in production in a veneer plant is made possible, waste of material is greatly reduced, production costs are lowered, and the quality of the finished plywood is improved.

The edge joining of strips of veneer is not new and has been carried out in various ways, such as by the use of gummed tape, by mechanical fasteners such as soft metal staples, and by edge gluing. The edge gluing of the veneer strips is the most desirable method of securing them together as it eliminates the use of undesirable superficial means such as staples or tape. However the edge gluing of veneer strips is not generally employed because the machines heretofore used for this purpose have been slow and expensive and unreliable and require the services of a large number of men to edge glue all of the veneer required in a large plant.

Some of the machines heretofore used for edge gluing veneer strips require the veneer strips to be fed through the machine in a direction lengthwise of the grain. This requires the veneer strips to travel a total distance in the machine equal to the total length of the edges being glued, for instance, if a sheet of veneer is one hundred inches long and six feet wide and comprises six pieces having five edge joints it would have to travel longitudinally a total distance of five hundred inches in a machine to complete the edge gluing. If this same piece travels through a machine in a direction crosswise of the grain the gluing will be completed in a very much less distance of travel and the distance of travel of the panel in the machine will not need to be much more than the width of the panel.

Other machines heretofore used for edge gluing veneer strips provide for feeding the veneer strips in a direction crosswise of the grain of the strips and stopping each joint between hot plates long enough to set the glue. Such machines are necessarily slow as the veneer must be stopped for the curing of each joint and it will be apparent that this will consume much time if veneer pieces are to be edge glued.

In accordance with my invention my machine provides for moving the veneer strips synchronously with a continuously moving heated platen and holding the adjoining edges of the veneer strips immovable relative to each other and immovable relative to the surface of the platen while the glue that secures the adjoining edges of the strips together is being cured and set.

In accordance with present practice in veneer plants a sheet of veneer stock coming in a continuous strip from a log in a lathe is cut transversely of the sheet and lengthwise of the grain of the wood to form panels. If no defects are present in the sheet it is cut into panels of a predetermined correct width. However there are usually numerous defective portions to be cut out of the sheet and the cutting out of these defective portions results in the production of a large number of narrow pieces which heretofore have usually been disposed of as waste and have not been utilized.

My present invention makes it possible to utilize a large proportion of these narrow strips of from two to twelve inches in width by providing a machine for edge gluing which is fast enough and inexpensive enough so that these strips may be utilized with practically no additional cost over present methods. In commercial operation the saving in material or yield per thousand feet of logs is increased by at least twelve and one half percent. On a thirty dollar log cost this would be a saving of approximately four dollars over and above the cost of present day methods.

My invention makes it commercially practical to edge glue all of the veneer pieces used in large veneer plants, including the pieces used for the cores or inside plies. This substantially eliminates the possibility of openings being left between the edges of adjacent pieces of core stock and results in the production of better plywood. Heretofore it has been common practice to feed the separate pieces of core stock through the glue rolls and place these separate pieces in edge to edge relation between the outer plies of stock with the edges of the core pieces as close together as they can conveniently be placed. The core, made up in this way often consists of a large number of relatively narrow pieces and this method has usually resulted in numerous small openings being left between adjacent pieces of the core or inside ply. These openings weaken the veneer, facilitate the entrance of moisture between the plys, detract from the appearance of the veneer and make it difficult to provide a good finish on the edge of the veneer. Edge gluing of the veneer pieces in my machine overcomes all of these difficulties and at the same time results in a saving in the cost of production of the veneer.

Another objectionable and wasteful feature of present practice which my machine overcomes is as follows: In present practice the veneer pieces which are used for the core are of irregular and uneven shape and size and are not sized or matched in any way to fit the panel being made. This results in uneven and overhanging edges of glued stock and these overhanging edges have to be removed with a loss of both glue and stock. When my machine is used it is possible and practical to have all pieces of stock cut to substantially the correct size so that there is very little waste to be trimmed away after the gluing of the panels is completed.

In accordance with my invention the pieces of veneer to be edge glued are trimmed so that they are of equal width and have straight edges to insure good edge to edge contact. The first step in the edge gluing operation is to apply glue to at least one edge of each veneer piece. This may be done either by hand or by mechanical means and the glue may be applied to both edges of the pieces if desired. Any suitable glue or adhesive can be used but I prefer a synthetic resin glue which sets very hard and strong under the application of heat and some pressure. The pieces are then fed to a continuously moving heated platen. Just ahead of the location where the glued edges of the pieces of veneer engage with the heated platen they are passed between rolls which press the pieces of veneer straight throughout their full length so that all joints are leveled and there are no high spots or low spots at the glued joints.

The glued edges of the continuously moving pieces extend crosswise of their direction of travel and are held firmly and immovably in contact with each other and with the heated platen from the time they engage said platen until the glue is completely set and cured. The thin edge glued veneer stock discharges from the platen in a continuous sheet which may be cut into pieces of predetermined size and is ready to be made up into plywood as soon as it has cooled. If desired the edge glued stock may be artificially cooled as any heat in the stock at the time glue is applied thereto for making it into plywood may dry the glue too rapidly. Upon discharging from this machine the edge glued stock may pass directly to clippers and saws if desired.

Preferably I provide for driving the continuously moving platen at a slower speed than the veneer travels and by driving means that will permit the platen to be moved at a faster speed than the driving means would move it so that when veneer is being fed to the platen the thrust of the veneer will drive the platen slightly faster than the platen driving means tends to drive it. Pressure on the adjoining edges of the veneer strips is obtained by using a driven feed to advance the veneer strips against the back pressure exerted by the platen. In feeding the veneer strips to the platen with sufficient speed and force to drive the platen and associated moving parts the adjoining edges of the veneer strips are pressed very firmly together and the veneer strips and platen and moving parts associated therewith all move together at the same rate of speed with no movement of the adjoining edges of the veneer strips relative to each other or relative to the platen surface on which they rest. Providing a platen drive which operates at a slightly slower speed than the veneer insures that the platen will always be moving when the machine is operating. This insures the thrust of the veneer will not have to do more than accelerate the platen and will not have to start the platen from a position of rest with the consequent danger to the abutting edges of the veneer strips.

If sufficient pressure between the adjoining edges of the veneer pieces is not obtained by operating against the normal inertia of the moving platen and associated parts a brake or drag can be used. On the other hand if this inertia provides too much resistance a means of partially overcoming the same may be provided to avoid applying too great pressure to the edges of the veneer pieces with a possible crushing effect. Veneer of different thickness may require different pressure.

I have obtained a satisfactory setting of the glue by maintaining the adjoining edges of the veneer pieces in contact with the heated moving platen for about fifteen seconds. Obviously this time may be varied for different glues and different degrees of heat. The size of the platen will determine the speed at which the stock may be moved. A platen six feet in diameter will provide sufficient curing time so that the edge glued stock may be discharged at the rate of about forty lineal feet per minute. The stock discharges in a continuous strip or sheet with the grain of the wood positioned crosswise of its direction of travel. While in contact with the heated platen the veneer stock is held straight with the edges of the strips in intimate contact and immovable relative to each other and relative to the surface of the platen. This provides a continuous operation that is very fast and that does not have any tendency to break loose cured or partially cured joints or to crush or otherwise damage the wood.

The table over which the veneer passes is provided with a curved section over which the feed belts operate and near the location where the veneer enters between said belts. This places the veneer strips under curvature at the time the adjoining edges are first pressed together and prevents over-riding of the adjoining edges.

Flexible spaced apart endless traveling belt means is provided to hold the stock in contact with the platen during the curing operation.

Other objects of this invention will be apparent from the following description and accompanying drawings.

In said drawings

Fig. 2 is a plan view of the same substantially on line 2—2 of Fig. 1.

Fig. 3 is a fragmentary elevation of the opposite side of the machine from that shown in Fig. 1, and showing the driving means for the platen.

Fig. 4 is a fragmentary sectional view of veneer feeding means taken substantially on broken line 4—4 of Fig. 1, parts being shown in elevation.

Fig. 5 is a fragmentary sectional view of veneer feeding means taken substantially on broken line 5—5 of Fig. 1, parts being shown in elevation.

Like reference numerals designate like parts throughout the several views.

Figure 1:
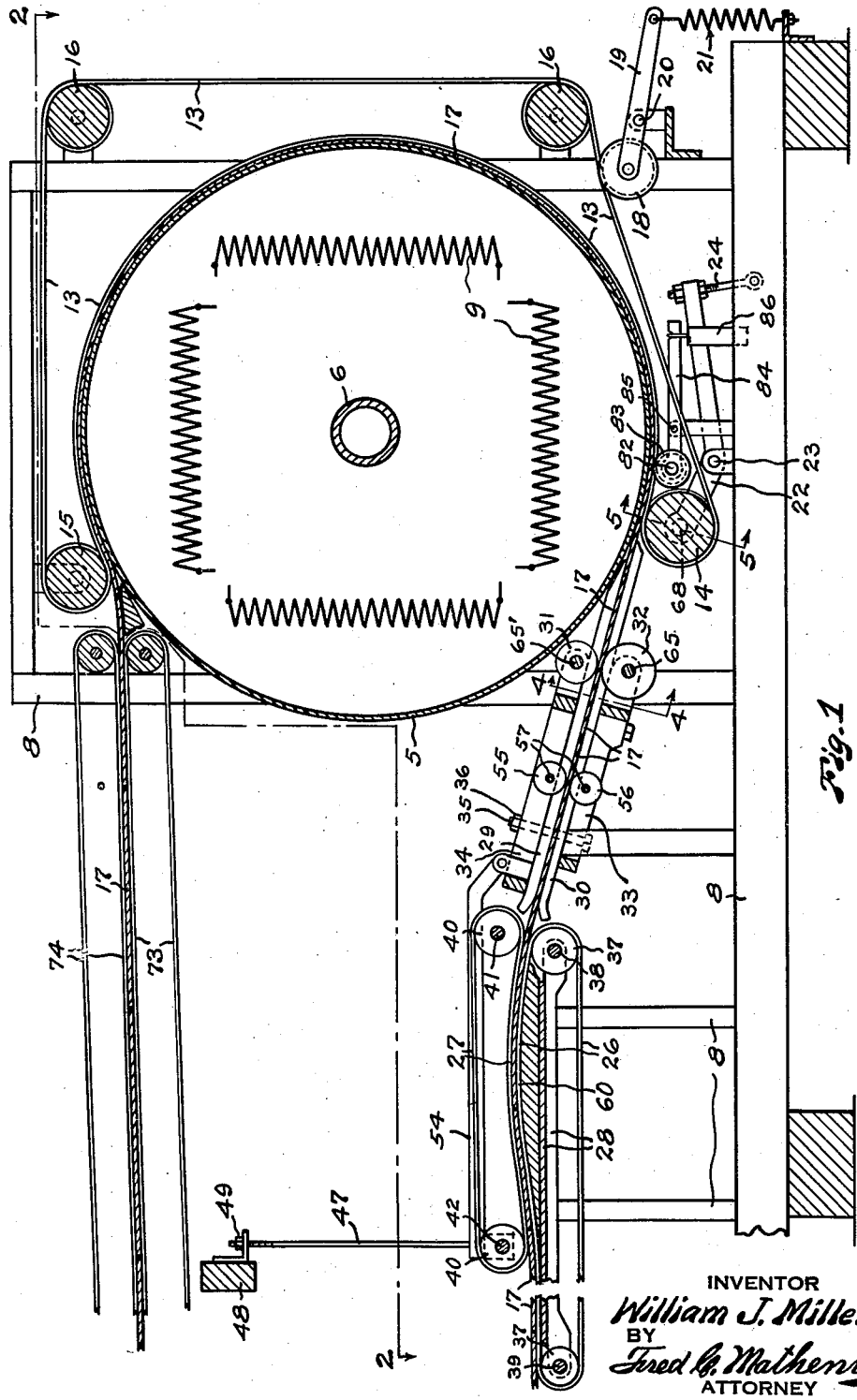
Fig. 1 is a side elevation with parts in section of a continuously moving platen device constructed in accordance with this invention.

Referring to the drawings, 5 designates a continuously moving platen in the form of a drum or cylinder of relatively large diameter and of sufficient length to accommodate the longest veneer strips that will be edge glued. Suitable axially disposed bearings are provided at each end of the platen 5. The axial platen bearings herein shown comprise axial tubular shaft means 6 rigid with the platen and supported on bearing rollers 7 that are journaled in a frame 8.

Suitable means are provided within the platen for heating the same. The heating means herein somewhat diagrammatically illustrated comprises electric heaters 9 within the platen 5 electrically connected with suitable rotary contact members 10 that are supplied with electric current by means of conductors 11 and brushes 12. Obviously other heating means may be used to heat the platen 5.

Suitable means are provided for holding veneer pieces 17 in relatively immovable engagement with the moving platen 5 while the glue on the abutting edges of the veneer pieces is being cured and set. This means comprises a plurality of transversely spaced apart pliable endless belt members 13 which are drawn snugly around the platen preferably for more than one half of its circumference. These pliable endless belt members 13 extend around a grooved roll 14 at the location where the veneer pieces 17 first engage with the platen 5 and around another grooved roll 15 at the location where the veneer pieces 17 leave the platen. The belt members 13 also extend over a plurality of guide rolls 16 by which the portions of said belt members that are not in engagement with the platen are guided clear of the platen while they traverse the distance between the two rolls 14 and 15. A resiliently supported tightener roll 18 is operatively engaged with each endless belt member 13 to provide individual tensioning means for each belt member. One way of resiliently supporting each tightener roll 18 is to rotatably mount the same on one end portion of a lever arm 19 that is fulcrumed on a pivot 20 and that has its other end portion connected with a tension spring 21. The pivots 20 and tension springs 21 are connected with the frame 8. I have obtained satisfactory operation by spacing the pliable endless belt members 13 about two inches apart.

The bearing at each end of the lower roll 14 is preferably mounted in one end portion of a lever arm 22 that is pivoted on a fulcrum 23 and is connected at the other end with bolt means 24 so that the position of the roll 14 relative to the platen 5 may be varied to suit the thickness of the veneer pieces that are being edge glued. The bearings at the end portions of the upper roll 15 are secured to the frame and this roll 15 is preferably positioned far enough away from the platen 5 to provide clearance for the discharge thereunder of veneer pieces of any thickness that will ordinarily be handled.

The pliable endless belt members 13 may be of twisted wire construction. The lower roll 14 has a plurality of spaced apart grooves 25 therein for the reception of the belt members 13. The depth of these grooves 25 is preferably substantially equal to the diameter of the belt members 13 whereby marring of the veneer pieces by the belt members 13 as the veneer pieces pass between the roll 14 and platen 5 is avoided and the veneer is held firmly in engagement with the platen beyond roll 14. The upper roll 15 and guide rolls 16 are also preferably annularly grooved to receive the belt members 13 and the grooves in all of these rolls keep the belt members properly spaced apart at all times.

One satisfactory means by which the veneer pieces may be fed to the platen comprises lower traveling feed belt means 26 movable on a feed table 28 and upper traveling feed belt means 27 positioned above the lower feed belt means 26. The end portions of the upper and lower feed belt means are spaced from the platen 5 and the intervening space is bridged by inclined veneer guiding means comprising transversely spaced apart upper guide bars 29 and transversely spaced apart lower guide bars 30. The guide bars 29 and 30 are offset transversely to avoid clamping and pinching the veneer and are alternately positioned above and below the veneer to receive the pieces of veneer therebetween.

At a location beneath the upper lap of feed belt 26 the feed table 28 is preferably provided with a curved or arched section 60 over which the feed belts 26 and 27 pass carrying the veneer pieces 17 between them. As the veneer pieces pass over this arched section 60 they will be bent to a curvature which will tend to stiffen them and this will tend to straighten out the edge and will help to level any adjacent edge portion that have a tendency to overlap. Two drive feed roll assemblies 31 and 32 are provided one above the other adjacent the platen 5 and just forward of the roll 14 to help feed the veneer to the platen 5 and to insure that the adjoining edges of the veneer pieces are flush and level Each driven feed roll assembly 31 and 32 preferably comprises a plurality of rollers secured o a shaft and spaced far enough apart longitudinally of the shaft to allow clearance for the guide bars 29 and 30 to pass between them. Obviously the driven feed roll assemblies 32 and 3 can be one piece rolls with annular slots to provide clearance for the guide bars 29 and 3 Preferably lower frame means 33 supports the lower guide bars 30 and lower leveling and feed roll 32 while upper frame means 34 support the upper guide bars 29 and upper leveling and feed roll 31.

Preferably the upper frame means 34 is adjustably supported above the lower frame means 33 so that the upper guide bars 29 and upper rolls 31 may be adjusted relative to the low guide bars 30 and lower roll means 32 to accommodate veneer of different thickness. One means for securing this adjustment is to connect the upper and lower frames 33 and 34 by threaded rods 35 having nuts 36 thereon which may adjusted to relatively adjust the two frames.

The forward ends of the guide bars 29 and terminate in close proximity to the ends of the feed belts 27 and 26 so as to receive the vene without allowing it to be unsupported as it transferred from the feed belts to the guide ba The other end portions of the guide bars 29 a 30 terminate in close proximity to the platen and roll 14, as shown in Fig. 1, so as to transi the veneer to the platen without leaving it u supported for any substantial distance and wit out danger of the veneer buckling or the adjoi ing edges thereof becoming displaced.

The lower feed belts 26 operate on belt whe 37 on shafts 38 and 39 respectively. The up feed belts 27 operate on belt wheels 40 on sha 41 and 42 respectively. The shaft 38 is driv by a link belt 43 through a clutch 44. The sh 41 is preferably driven from the shaft 38 gearwheels 45, Fig. 3, which interconnect th two shafts and provide for driving the lov belts 26 and upper belts 27 at the same spe The gear ratio of the belt driving means provi for driving the belts 26 and 27 faster than rolls 31 and 32.

Preferably auxiliary rollers 46 are provided the shafts 38 and 41 between the belts 27 to assist in leveling the adjoining edges of the veneer pieces and to help feed the veneer forward.

The shaft 42 at the forward end of the upper feed belts 27 is supported by rods 47 that are adjustably connected with overhead supporting means 48 by nuts 49. The rods 47 floatingly support the weight of the shaft 42 and rollers 40 when the machine is running empty and allow these parts to move upwardly a slight amount when veneer is passing between the belts 27 and 26. A slight amount of vertical floating movement is also allowed the inner shaft 41 of the upper feed belts by allowing a small amount of movement between bearing brackets 50 that support said shaft and the frame means 34 with which said bearing brackets 50 are connected. This may be accomplished by connecting the inner end portions of the brackets 50 with the frame means 34 by means of pivots 51 and using bolts 52 with adjustable nuts 53 thereon to connect the brackets 50 with the frame means 34 at a distance from the pivot means 51 so as to allow a small amount of vertical floating movement. The vertical floating movement thus provided for the shaft 41 and the adjustment required by the frame 34 are not enough to impair the operation of the gears 45 that provide the driving connection between the shafts 37 and 41. Bars 54 hold the shafts 41 and 42 in spaced apart relation.

As the feed belts are running at a faster speed than the veneer feeding and leveling rolls 31 and 32 there will be some slippage between these feed belts and the veneer and the feed belts will always tend to crowd the adjacent edges of veneer pieces together. Providing for vertical floating movment of the upper feed belts 27 facilitates this slippage without danger of crowding the adjoining edges of the veneer pieces into overlapping relation. Also this floating movement helps to allow pieces of veneer which are fed between the feed belts at an angle to automatically rectify their alignment so that all edges of all pieces will be snugly crowded together throughout the entire length of the pieces.

To facilitate the feeding of narrow veneer pieces I also preferably provide a plurality of upper feed rolls 55 and lower feed rolls 56 a short distance in front of the feed rolls 31 and 32. These rolls 55 and 56 are mounted on shafts 57 that are connected by gears 58 and driven by link belt means 59 from the shaft of the feed roll 32.

Any suitable drive means may be provided. The drive means herein shown comprises a motor 61 having a driving connection with a speed reduction gear 62. A link belt 63 connects the speed reduction gear 62 with a clutch member 64 on the shaft 65 of the lower feed roll 32. A clutch lever 66 provides for selectively connecting or disconnecting the clutch member 64 and shaft 65 to selectively drive or stop said shaft. At the side of the machine opposite from the clutch 64 the shaft 65 of lower feed roll 32 is preferably connected with the shaft 65' of upper feed roll 31 by gearwheels 67, see Fig. 3. Also this same shaft 65 is connected with the shaft 68 of the lower roll 14 which carries the pliable belt members 13 by a link belt 69 operable on sprocket wheels 70 and 71. The gear ratio of link belt 69 and sprocket wheels 70 and 71 provides for driving the lower roll 14 which carries the pliable belt members 13 at a slower peripheral speed than the feed rolls 31 and 32. However the sprocket wheel 71 is connected with the shaft 68 by overrunning clutch means, such as ratchet devices 72 so that the thrust of the veneer will ordinarily furnish the power to move the platen 5 and pliable belt members 13 while the driven sprocket wheel 71 will idle at a slower rotary speed than the shaft 68. In starting the machine the driving means for shaft 68 will impart initial momentum to the platen 5 and belts 13 so that these parts will be moving a little slower than the veneer at the time the first piece of veneer engages them. This places the thrust of driving the platen and belts on the veneer without subjecting it to the shock of starting these parts from rest. Also when the feeding of veneer stops and after the last piece of veneer has passed the feed rolls 31 and 32 the drive to shaft 68 will keep the platen 5 and pliable belts 13 moving until the veneer has all been discharged from the machine.

Preferably the veneer discharges from the machine in a continuous strip and between moving discharge belts 73 and 74 that convey it away to any suitable location where it is clipped into panels and laid up to make plywood.

Preferably the upper roll 15 over which the pliable belts 13 pass is driven from shaft 68 by a link belt 75 operating on sprocket wheels 76 and 77 and discharge belts 73 and 74 are connected by gear wheels 78 and driven from roll 15 by link belt 79 and sprocket wheels 80 and 81. Preferably a transverse shaft 82 having a plurality of rollers 83 thereon is provided just to the rear of the lower roll 14 which carries the pliable belt members 13. The rollers 83 are slightly narrower than the spaces between the pliable belt members 13 and run on the veneer and help to squeeze out any air pockets or bubbles that may occur between the veneer and the platen. Also they help to insure perfect contact between the veneer and the platen. The shaft 82 is supported by lever arms 84 that are fulcrumed on pivots 85 and have weights 86 thereon to yieldingly hold the rollers 83 in engagement with the veneer.

The veneer pieces 17 may be stacked one upon another on any suitable support positioned near the head end of the lower feed belt means 26. Glue in liquid form may be sprayed or otherwise applied on one or both edges of the pieces 17 and the pieces 17 may be fed onto the lower feed belt means 26, manually or by mechanical means, with their glued edges positioned close together whereupon they will pass under the upper feed belt means 27 and be crowded together and advanced toward the platen.

The veneer pieces 17 are fed crosswise of the feed table in edge to edge relation preferably with the adjacent edges substantially parallel and spaced apart a short distance. The upper and lower feed belt means 26 and 27 tend to hold the veneer pieces flat and prevent any overlapping of the edges thereof as said pieces pass toward the platen 5. The feed rolls 31 and 32 travel at a slower speed than the feed belts 26 and 27 and this tends to slow up and hold back the moving pieces and results in the adjoining edges of the veneer pieces being firmly pressed together before the veneer pieces pass between the feed rolls 31 and 32. The thrust required to move the platen 5 and belts 13 keeps these edges pressed firmly together. As the contacting edges of the veneer pieces with the wet glue thereon pass between the roll 14 and platen 5 the adjoining edges of the veneer pieces are leveled and pressed flush with each other and the curing and setting of the glue begins. When two adjoining edges of the veneer pieces pass under the roll 14 they also pass under the endless belt members 13 and when they pass beyond the roll 14 they are subjected to the further pressure of rollers 83 and are held very firmly in contact with the continuously moving platen 5 by the belt members 13 and each pair of adjoining edges is held immovable relative to the surface of the platen 5 and immovable relative to each other until the glue is set with ample strength to hold the edges. By using a strong quick setting synthetic resin glue I am able to edge glue the veneer pieces together so strongly that when the finished veneer sheet is put under tension it will split or separate along other lines but not on the glue lines, thus showing that the glued edges are stronger than the remainder of the sheet.

Different glues may require a different degree of heat or a different curing time. I have been able to cure the glue by maintaining the glued edges in contact with the heated moving platen 5 for about fifteen seconds. The size of the platen may be varied to suit the requirements as to rate of output desired. With a platen six feet in diameter I am able to discharge edge glued stock of any width up to the maximum width of the machine at a rate of about forty lineal feet per minute. At this rate it is possible to edge glue the veneer stock for a large veneer plant with one edge gluing machine.

The belt members 13 are of heat resistance material such as twisted wire cable, are close enough together so that no relative movement of the edge portions of the pieces between said belts is permitted and are provided with individual tighteners so that each belt is always maintained taut. Obviously belt structure of this nature will operate efficiently with short lengths of veneer pieces where only part of the belt members are in engagement with the stock and the rest of said belt members are operating idly in contact with the platen 5.

The foregoing description and accompanying drawings clearly disclose a preferred embodiment of my invention but it will be understood that this disclosure is merely illustrative and that changes may be made within the scope and spirit of the following claims.

I claim:

1. Apparatus for edge gluing veneer strips comprising a continuously moving cylindrical heated platen; continuously moving feed means positioned ahead of said platen feeding veneer strips that have glue coated edges to said cylindrical platen with the adjacent glue coated edges thereof positioned in abutting relation and extending crosswise of the direction of movement of the veneer strips; means associated with the feed means to produce a curvature in the veneer strips, while fed by said means, to stiffen said strips and thereby tend to straighten out the edges of the veneer strips and prevent overlapping of adjoining edges; and a plurality of independent spaced apart pliable veneer holding members extending partially around said cylindrical platen and positioned to engage with said veneer strips and hold the same in engagement with said cylindrical platen with the abutting glue coated edges of said veneer strips held immovable relative to each other and immovable relative to said platen while the glue on the edges of said veneer strips is being set by heat from said platen.

2. Apparatus for edge gluing thin veneer strips comprising a cylindrical heated platen supported for axial rotation; movable feed means positioned to feed veneer strips that have glue coated edges to said cylindrical platen in a direction substantially tangential to the circumference of said platen with the adjacent glue coated edges of the strips positioned in abutting relation and extending crosswise of the direction of movement of the strips; a plurality of spaced apart pliable veneer holding members extending partially around said cylindrical platen and positioned to engage with said veneer strips and hold the same in engagement with said cylindrical platen with the abutting glue coated edges of said veneer strips held immovable relative to each other and immovable relative to said platen while the glue on the edges of said veneer strips is being set by heat from said platen; driving means connected with said pliable veneer holding members and said platen for continuously moving the same; and other drive means continuously moving the veneer feed means at a speed faster than the first driving means drives the veneer holding members and the platen, the driving means for the veneer holding members and platen including overrunning clutch means comprising pawl and ratchet devices whereby the faster drive speed for the veneer feed means permits overrunning of the speed of the drive for the veneer holding members and platen when edge glued and joined veneer strips are continuously fed to the holding members and platen to relieve the thin veneer strips of the strain of starting a load under thrust, the reduced resistance to movement of the joined veneer strips offered by the platen and the pliable veneer holding members providing a thrust on the veneer strips tending to keep the adjoining edges of the veneer strips crowded together.

3. In apparatus for edge gluing thin veneer strips, upper and lower pliable driven feed belts positioned to receive therebetween and advance the veneer strips in edge to edge adjoining relation with the edges of the strips extending crosswise of the belts; means cooperating with the feed belts for retarding the movement of the veneer strips, whereby the feed belts will crowd the adjoining edges of the veneer strips together; and a curved deflecting member positioned in engagement with one of the belts providing a curvature in the belts and the veneer strips carried therebetween whereby edge to edge abutting relation of the edges of said veneer strips is secured and overlapping of the edges of the strips avoided.

4. In apparatus for edge gluing thin veneer strips, upper and lower pliable driven feed belts positioned to receive therebetween the veneer strips in edge to edge relation with the edges of the strips extending crosswise of the belts; means beyond the feed belts for retarding the movement of the veneer strips, whereby the feed belts will crowd the adjoining edges of the veneer strips together; and a curved deflector member positioned in engagement with one of the belts providing a curvature in portions of both of said belts and in the veneer strips therebetween whereby the edge portions of said veneer strips are held straight and caused to abut squarely together and overlapping of adjoining edges of said veneer strips is prevented.

5. In apparatus for edge gluing thin veneer strips, upper and lower pliable driven feed belts positioned to receive therebetween veneer strips that have glue on their edges and are disposed in edge to edge relation with the edges of the strips extending crosswise of the belts; feed rolls beyond the feed belts movable at a slower speed than the feed belts for retarding the movement of the veneer strips, whereby the feed belts will crowd the adjoining edges of the veneer strips together; curved deflector means positioned in engagement with the belts providing curvature in portions of both of said belts and in the veneer strips therebetween whereby the edge portions of said veneer strips are held straight and caused to abut squarely together and overlapping of adjoining edges of said strips is prevented; and continuously moving glue curing means positioned beyond said feed rolls to receive the veneer strips and cure the glue thereon.

WILLIAM J. MILLER.